Figure 1:
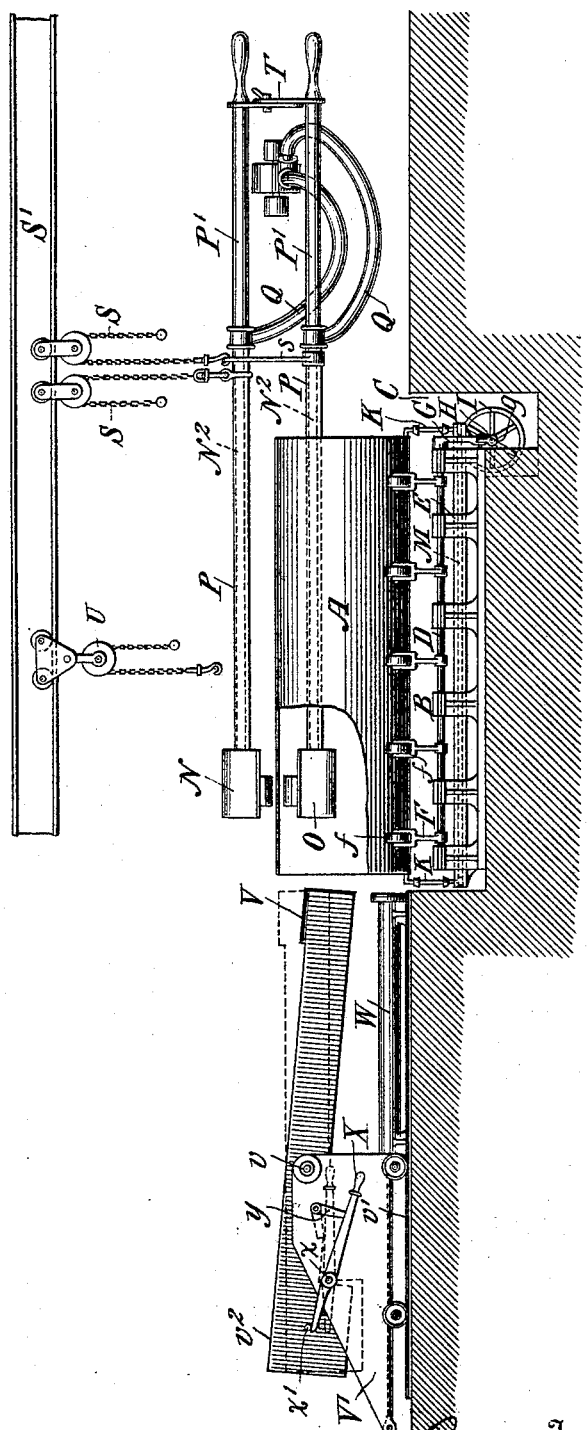

(No Model.)

C. L. ROWLAND.
WELDING APPARATUS.

No. 519,776. Patented May 15, 1894.

Witnesses
C. E. Ashley
Alfred W. Van Zee.

Inventor
Charles L. Rowland
By his Attorneys
Baldwin, Davidson & Wight (No Model.) 2 Sheets—Sheet 2.
C. L. ROWLAND.
WELDING APPARATUS.
No. 519,776. Patented May 15, 1894.
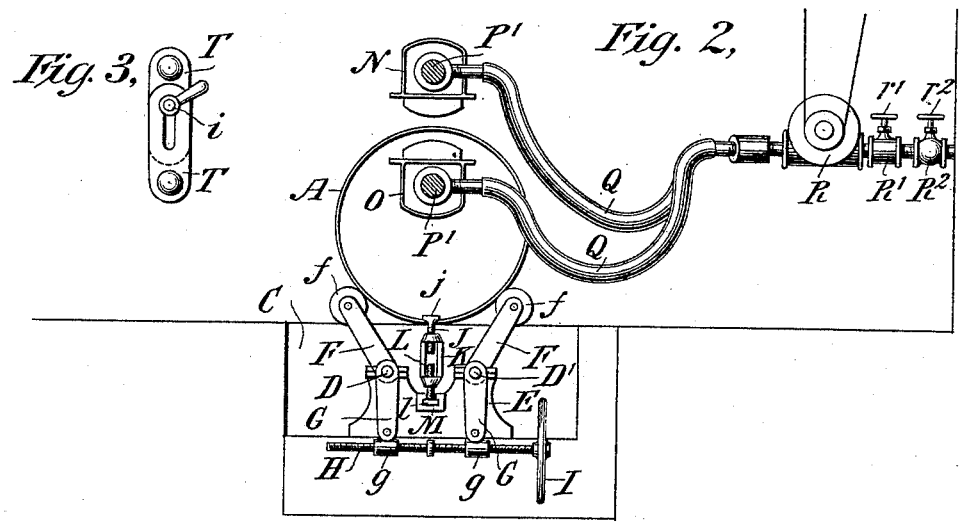
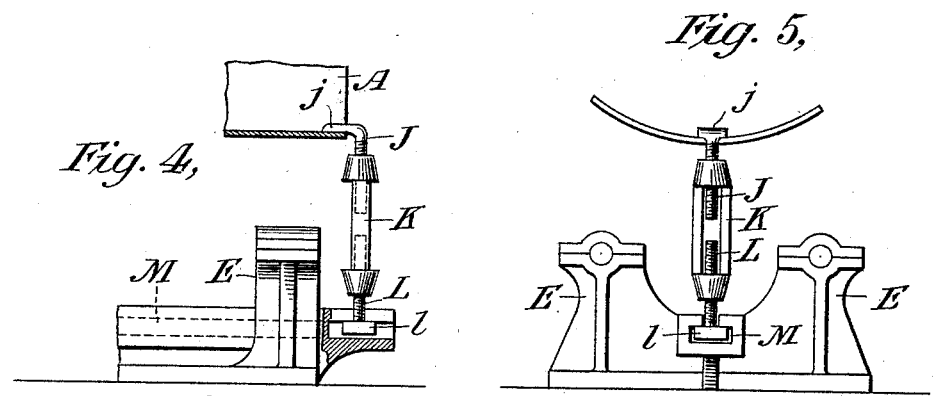
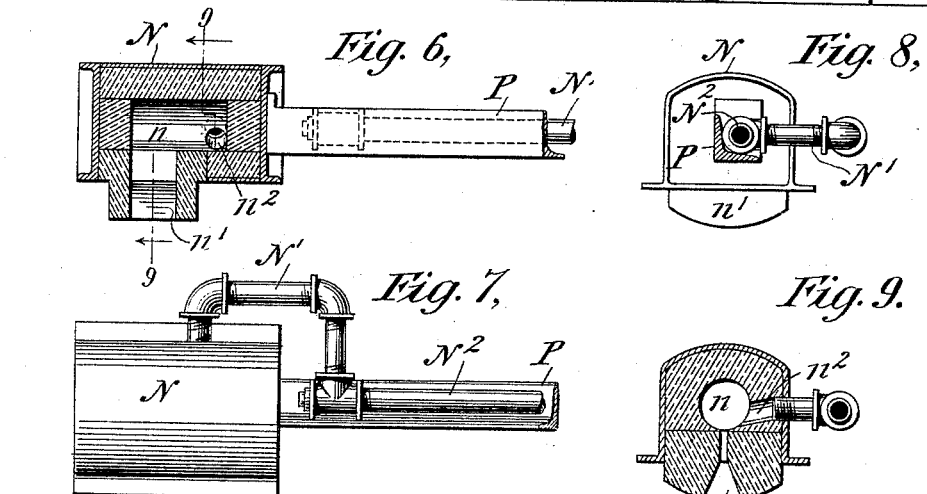

UNITED STATES PATENT OFFICE.

CHARLES L. ROWLAND, OF BROOKLYN, NEW YORK.

WELDING APPARATUS.

SPECIFICATION forming part of Letters Patent No. 519,776, dated May 15, 1894.

Application filed December 22, 1893. Serial No. 494,414. (No model.)

*To all whom it may concern:*

Be it known that I, CHARLES L. ROWLAND, a citizen of the United States, residing at Brooklyn, in the county of Kings and State of New York, have invented certain new and useful Improvements in Welding Apparatus, of which the following is a specification.

My invention relates to welding apparatus of a class more especially adapted to weld the seams of cylinders, but is applicable to the welding of seams of other articles or bodies. I provide a non-traveling cradle of an improved construction, by which the cylinder is held while being welded, and that is adjustable in order to bring the seams of cylinders of different diameters into the plane or zone of operation of the horizontally movable heating and welding apparatus. The arrangement of the cradle is such that the cylinder may be readily placed in position and removed without the use of hoists. Gas furnaces are employed to heat the cylinder at the lap or seam, and their frames or supports are connected together by an adjustable device and separately supported, preferably by hangers which are movable back and forth parallel with the axis of the cylinder or the plane of the joint. The furnaces face each other and are adapted to be placed on opposite sides of the joint, and to be moved, as required from one end thereof to the other. An anvil pivotally connected with a carriage mounted to move on a track or way may be caused to follow the furnaces and the welding may be progressively accomplished by hammering or in other ways. The furnace on the other or upper side of the cylinder is so supported that by gravity it approaches and bears against the cylinder at the lap or joint, while the opposite furnace by gravity falls away from the cylinder, and when the cylinder or other article is in position the workman raises the lower furnace against the cylinder and then, by means of the adjustable device connecting the two furnace frames or supports, lock them in position, one on each side of the lap or joint, along which they may be moved as already stated. The furnace frames are elongated and the furnaces carried at the ends as usual, and mingled air and gas, or hydro-carbon, may be supplied to them by supply pipes extending along the frames to the furnaces, respectively, and connected at their opposite ends by flexing pipes with a mixing blower in which the air and gas are commingled. The furnaces are of a peculiar novel construction hereinafter specified.

I am well aware that heretofore it has been proposed to have facing furnaces arranged on opposite sides of a seam to be welded, each furnace being supported by a suitable frame either hung from a way or support above or moving on a track or way on the ground or floor, for the purpose of permitting of their adjustment or adaptation to the work being done. For instance the patent of Bertram, No. 15,159. dated June 17, 1856, shows in a welding apparatus such a general arrangement of coke furnaces, each of which is supplied with air forced under pressure through a suitable tube leading to the furnace. The patent of Cooke, No. 27,619, dated April 3, 1860, shows oppositely arranged gas furnaces or burners and welding hammers, and the patent of Root, No. 346,828, also shows such gas furnaces and welding devices. I am also aware of the patents to Rowland, Hill and McLachlan, Nos. 384,081 and 384,082, dated June 5, 1888, showing adaptations of the devices or organizations above referred to as pointed out specifically in the claims of said two patents. My improvements while availing of the common and well known organizations of the Bertram and Cooke patents constitute improvements therein and are clearly distinguished from the patents of Root and Rowland, Hill and McLachlan as will hereinafter more particularly appear.

In the accompanying drawings, Figure 1 is a side elevation of my improved welding apparatus. Fig. 2 is an end view. Fig. 3 is a detail view showing the adjustable device connecting the furnace frames. Figs. 4 and 5 are detail views of the devices for clamping the cylinder in position in the cradle. Figs. 6, 7, 8, and 9 are detail views of the gas furnaces.

The cylinder A to be welded is supported on a cradle B which is preferably arranged in a well or depression C. The cradle is shown as consisting of parallel bars or rock shafts D' D', mounted in uprights or standards E on opposite sides of the central longitudinal line of the cradle. Each rock shaft carries a series of arms F in the outer ends of which are journaled anti-friction rollers $f$. Each rock shaft has a depending arm G, carrying at its lower end a nut $g$, through which extends a screw shaft H, secured to a hand wheel I. The screw-threads on the opposite ends of the shaft H are reversed, the arrangement being such that the lower ends of the arms G may be moved toward and from each other, the effect being to turn the rock shafts so as to cause the roller-carrying ends of the arms F to move in curved lines toward or from each other, and thus to rise or fall to adjust the elevation of the cylinder. In order to hold the cylinder against either longitudinal or circumferential movement and to support it firmly in the cradle, I employ clamping devices which are adjustable in the cradle, and may be detachably secured to the cylinder. Preferably each of these clamping devices consists as shown in the drawings of a screw-threaded bolt J having a laterally projecting arm or head $j$ adapted to extend into the cylinder and engage with the inside thereof. The screw-threaded end of the bolt extends through one end of a turn buckle K, and a screw-threaded bolt L extends through the opposite end thereof. The head $l$ of the bolt L is arranged in and is adapted to move back and forth in a slotted way M in a casing or casting secured to or forming part of the standards E and arranged in the longitudinal central line of the cradle. The clamping devices may be adjusted toward and from each other to any desired extent, within the limits of the length of the cradle. With this construction and arrangement of the cradle it is obvious that the cylinders may be rolled from the floor into the cradle and then adjusted to bring the lap or joint into the welding plane; and when the operation is finished the cylinder may in like manner be rolled out of and away from the cradle. The clamping devices serve to prevent shifting of the cylinders under the jar or impact of the welding hammers.

In order to heat the edges of the cylinder forming the lap or seam both inside and out, along the entire line of the seam, I employ furnaces N O, which may be similar to each other in all respects. Each furnace is preferably composed of fire brick surrounded by a jacket of iron. It is suitably mounted upon the end of the frame-bar P and is chambered at $n$ and is provided with a lateral orifice or burner $n'$ adapted to be arranged close to the seam to be welded. The chamber of the furnace as shown in Fig. 7 is cylindrical, and is connected with a pipe or passage $n^2$, through which the fuel is introduced. This pipe or passage is preferably so arranged as to deliver the fuel in an inclined or tangential direction along the side of the cylindrical chamber, so as to cause it to whirl or circulate rapidly therein before its discharge through the relatively narrow orifice, and thus promote combustion and insure a high degree of heat. The pipe or passage $n^2$ is connected by suitable pipes or couplings N' with a pipe N² arranged on the frame bar P, communicating by a flexible pipe Q with a blower R of any suitable construction located at any desirable point to which air and gas in regulated quantities are admitted. The frame bar P is preferably made of T-iron or angle-iron as shown in Fig. 7, and the pipe is laid in the angle of the iron. By this arrangement a stiff light frame is provided and a relatively small gas pipe may be employed, the furnace being supported by a strong frame bar which also supports the pipe. The outer end of each frame bar or that farthest from the furnace is provided with a handle P', by which the furnaces may be moved relatively to each other, or both relatively to the cylinder. Each frame bar and furnace is supported by a separate hanger S which may be of any suitable construction. As shown it consists of hoisting apparatus detachably connected with the frame bars and mounted to move back and forth longitudinally parallel with the axis of the cylinder on a track or way S'. The chain of the hoisting apparatus which supports the frame bar of the lower furnace is preferably connected thereto by means of a yoke $s$ which is suitably curved to avoid interference with the operation of the frame bar of the upper furnace. The weight at the furnace ends of the frame bars is such as to overbalance them and in order to hold them at the proper distance apart, I provide means at the handle ends of the frame bars, to so connect them that they may be adjusted toward and from each other. The devices shown for this purpose consist of slotted plates T one on each frame bar, and a clamping bolt $i$, passing through the coincident slots. Ordinary overhanging traveling hoisting devices U may be mounted on the rail S' in convenient position to be attached to either of the frame bars near the furnace ends thereof, to raise or lower them or to assist in conveying them from one point to another. Any suitable hammering devices may be employed. None are shown in the drawings, but in connection with the hammering devices I employ an anvil V, which is pivotally mounted at $v$ in a carriage V', which is arranged to be moved back and forth on rails $v'$ by a hydraulic cylinder W or other suitable motive power. The end $v^2$ of the anvil overbalances the opposite end which is adapted to be extended the desired distance into or through the cylinder.

In order to depress the working end of the anvil, I employ a hand lever X pivoted at $x$ to the carriage, and engaging with a stud or cross-bar $x'$ on the weighted end of the anvil. By depressing the outer or handle end of the lever the working end of the anvil may be lowered and may be held in this position by means of a dog Y as shown in Fig. 1.

The furnaces are moved along the seam and are followed by the anvil and the welding is accomplished all as suggested in the patents of Bertram and Cooke. I however employ the new style of carriage and anvil devices with all their capabilities. It will also be observed that I have a convenient and special means of adjustment of the furnace frames—such adjustment being sometimes required in operating upon cylinders differing in size: that the air and gas for the furnaces are mixed at the blower and that a single air and gas pipe extends to the supply pipe of each furnace, lying in the angle of the frame bar, and there is therefore no danger of explosion, such as might occur as suggested in the Rowland, Hill and McLachlan patents, where separate pipes, one for air and one for gas, lead to the supply pipe of the furnace and I also reduce the number of pipe connections: and finally that I have an improved form of gas furnace wherein the swirling or whirling rotation of the air and gas in the chamber of the furnace insures a further and complete commingling of the air and gas and insures a good combustion.

The blower R as before stated is of an ordinary construction except that it is provided with two inlets, one R' and the other $R^2$. The inlet R' is for air and may consist as shown of a short tube open at its outer end to the atmosphere, and provided with a valve $r'$ by which the quantity of air supplied to the blower may be definitely regulated. The inlet pipe $R^2$ is connected with any suitable source of gas supply, and is provided with a regulating valve $r^2$ by which the amount of gas admitted to the blower may also be definitely regulated. With this organization the air and gas are drawn into the blower in proper regulated quantities to give the proper combustion in the furnaces, and the air and gas are well mixed in the blower, and are forced by the blower through the pipes leading to the furnaces respectively. With this organization there is no danger of explosion, and the pressure of the mixed air and gas at the burner may be regulated as desired by proper regulation of the amount supplied, or by regulation of the speed of the blower.

I claim as my invention—

1. The combination, substantially as set forth, of a non-traveling cradle having adjustable devices for supporting the cylinder to be welded with the seam in the proper plane, facing furnaces movable along the seam, and a horizontally movable anvil also movable along and beneath the seam.

2. The combination with means for heating the lap or seam of a cylinder and welding the same, of a non-traveling cradle provided with means for raising and lowering the cylinder, to bring the seam into the plane of the heating and welding devices, substantially as set forth.

3. In a welding apparatus, a cradle provided with devices for supporting the cylinder, raising and lowering it, and holding it against endwise and circumferential movement, in combination with means for heating and welding the lap or seam of the cylinder, substantially as set forth.

4. In a welding apparatus, the cylinder holding cradle having parallel bars or rock shafts, roller-carrying arms mounted thereon, and means for rocking the shafts to cause the roller-carrying arms to be raised or lowered by being moved toward and from each other, to raise or lower the cylinder to be welded, substantially as set forth.

5. The combination, substantially as set forth, of the non-traveling cylinder supporting cradle, the longitudinally movable facing furnaces, and the longitudinally movable anvil carried by the carriage operated by a hydraulic cylinder.

6. The combination, substantially as set forth, of the non-traveling cradle for adjustably supporting the cylinder and holding it against endwise and circumferential movement, the horizontally movable anvil, the horizontally movable facing furnaces and their separately supported frames, the furnace ends of the frames being overbalanced, and the adjustable connection between the furnace frames.

7. The combination, substantially as set forth, of the cylinder supporting cradle located below the floor level and having means for supporting and vertically adjusting the cylinder to be welded, the horizontally movable adjustable furnaces, and the horizontally movable anvil.

8. The combination with non-traveling means for supporting and horizontal movable furnaces for heating a cylinder seam or lap to be welded, of an anvil pivoted in a carriage and provided with means for holding it in its adjusted position, and means for moving the carriage back and forth.

9. In a cylinder welding apparatus, a cylinder-supporting cradle provided with means for simultaneously adjusting the cylinder throughout its length vertically whereby the lap or seam thereof may be readily adjusted to and supported in the proper plane, in combination with means for heating and welding the lap, substantially as set forth.

10. The combination, substantially as set forth, of the non-traveling cylinder-supporting cradle, the longitudinally movable facing furnaces, the longitudinally moving anvil, a way or track upon which it moves, and means for moving the anvil uniformly and gradually forward as the work proceeds.

11. In a cylinder welding apparatus, the combination, substantially as set forth, of a pair of horizontally movable overbalanced facing furnaces, their adjustable frame bars supported intermediate their ends, and adjustable connections between the frame bars independent of the frame bar supports and located at one side thereof, whereby the furnaces may be adjusted and locked in fixed relation to each other and to the seam of the cylinder lying between them.

In testimony whereof I have hereunto subscribed my name.

CHARLES L. ROWLAND.

Witnesses:
FRANK S. OBER,
EDWARD C. DAVIDSON.